(12) United States Patent
Günther

(10) Patent No.: US 6,368,100 B1
(45) Date of Patent: Apr. 9, 2002

(54) HOT CHANNEL STOPPER

(75) Inventor: Herbert Günther, Allendorf/Eder (DE)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 0 days.

(21) Appl. No.: 09/393,706

(22) Filed: Sep. 10, 1999

(30) Foreign Application Priority Data

Sep. 10, 1998 (DE) ..................................... 298 16 253 U

(51) Int. Cl.[7] .............................................. B29C 45/22
(52) U.S. Cl. ....................................................... 425/572
(58) Field of Search .................................. 425/570, 572

(56) References Cited

U.S. PATENT DOCUMENTS 5,220,154 A * 6/1993 Gunther ............... 425/DIG. 13

FOREIGN PATENT DOCUMENTS

| DE | 3211342 A1 | 9/1983 |
|----|------------|--------|
| EP | 0 534 549 A2 | 1/1993 |
| EP | 0 630 733 B1 | 12/1994 |
| EP | 0 845 345 A1 | 6/1998 |

* cited by examiner

*Primary Examiner*—Tim Heitbrink
(74) *Attorney, Agent, or Firm*—Israel Gopstein

(57) ABSTRACT

Plugs (20) that can be removed and that are made in two parts are used to close off channel sections in a hot-channel distributor (10); these are arranged so as to subtend an acute angle α with the principal axis (A) of a channel (15) that can be charged with a plastified mass. A continuous sealing edge of the face surface (30) of these is pressed onto a continuous annular surface (40) that encloses an opening (42) to the channel (15). The angle α lies between 40° to 45°. The plug (20) incorporates a pressure piece (26) that is located in front of a screw body (22) that can be screwed into an inclined bore (16) that opens out into area of the channel in the distributor (10) that is to be sealed off. At the sealing edge (31), the face surface (30) of the plug is flat, although it can be concavely curved inward or be crowned (32), much like a segment of a sphere, the diameter of which is defined by the diameter of the smallest radius of the sealing edge (31). The outer annular surface (40), which is circularly restricted, can be arranged on an elbow (38) at which the channel (15) makes the transition to become a branch of the distributor (10). In a through channel (15) with a series of branches (34) selected sections (36), the ends of which have annular surface (40) that are inclined opposite to each other, can be closed off by the associated plugs (20).

22 Claims, 2 Drawing Sheets

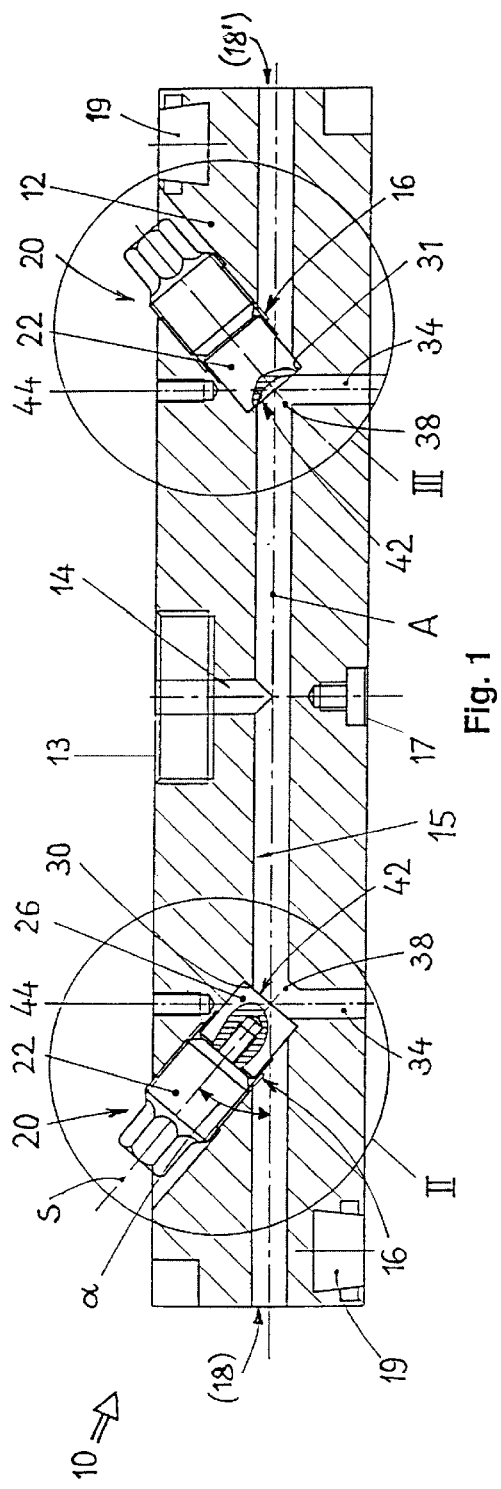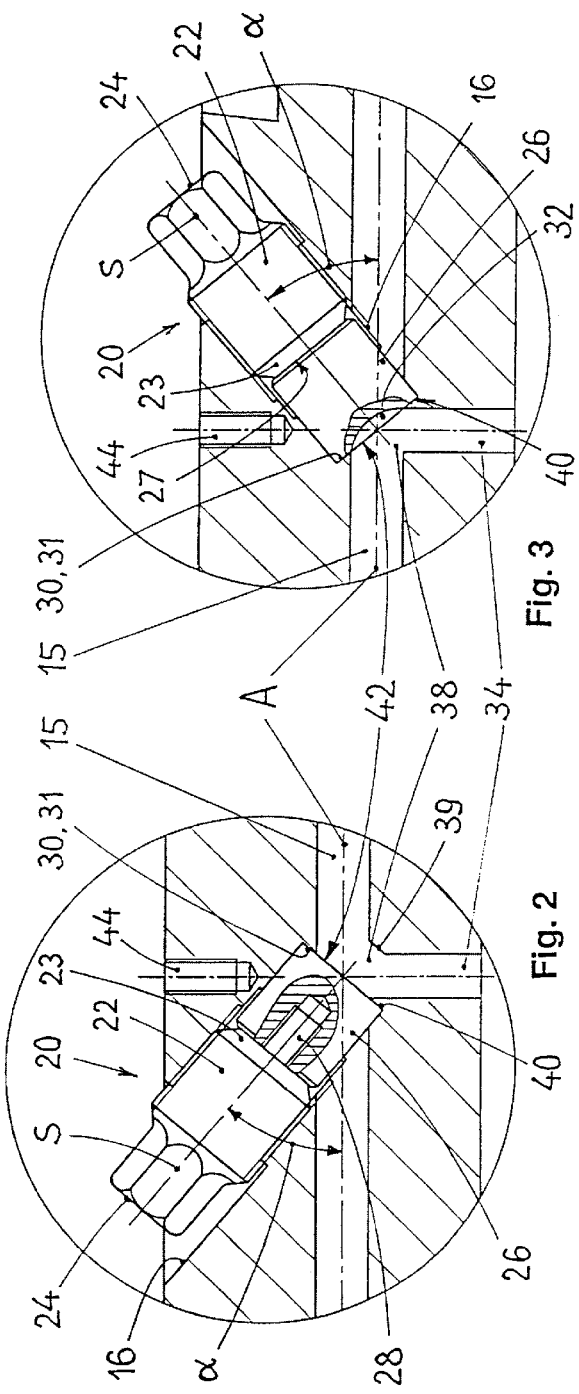

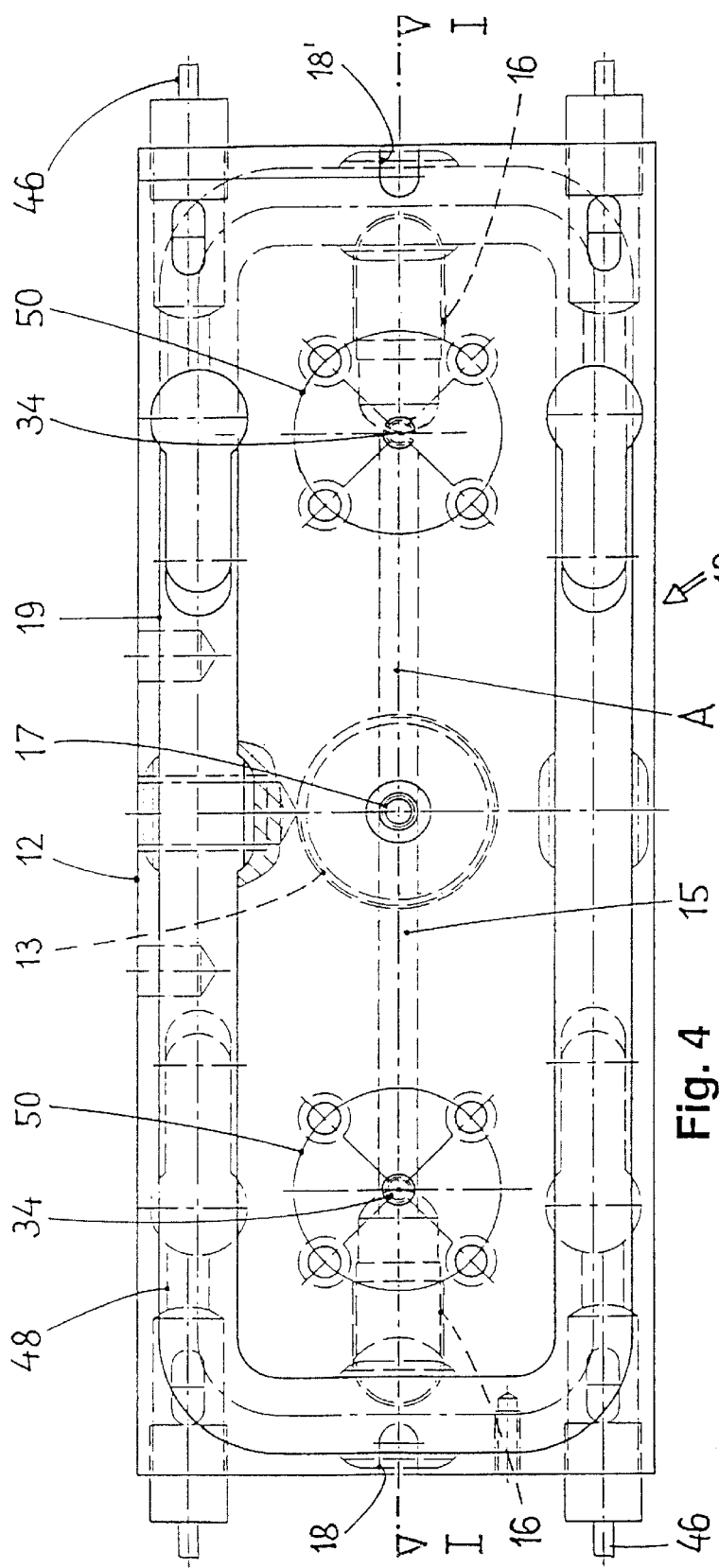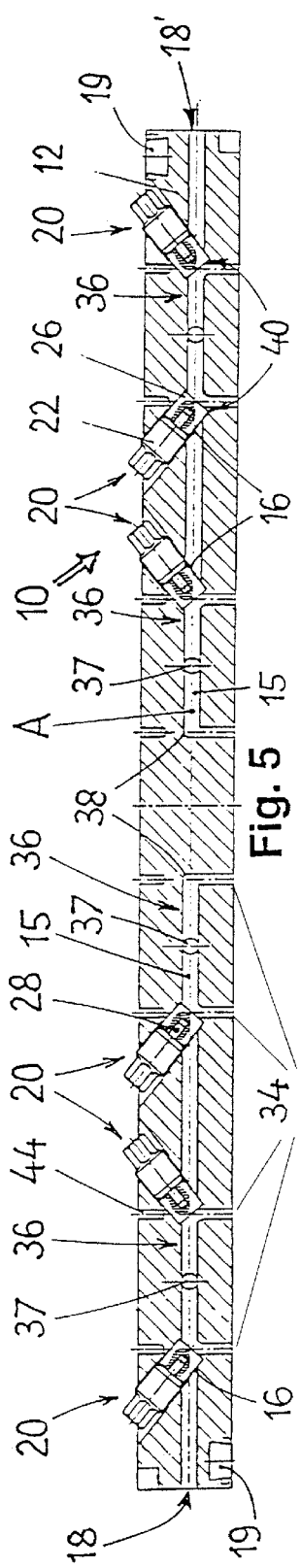

HOT CHANNEL STOPPER

The present invention relates to an arrangement for closing off sections of channels in a hot-channel runner.

It is a known fact that in devices that are used for hot-channel injection moulding, cylindrical plugs can be used in the corner area of a runner channel; these are used to close off the ends of the channel and/or to connect sections of the channel that are angled as deflectors to tapered bores so as to produce a pressure-tight fit. As an example, according to EP 0 226 798 A1, plugs are inserted coaxially at the ends of a main runner in order to connect them to a diverter with a tapered hole. This continues in the plug with an angled bore that leads to an outlet opening of the runner. A constriction is formed at the bevel of the bore and, in principle, this presents resistance to the flow; if plastified injection material adheres at this point, this makes cleaning extremely difficult or impossible, so that the plug as a whole has to be replaced. These plugs are fixed in the runner by being soldered in position, for which reason mechanical cleaning of the channels is not possible without considerable effort.

A similar arrangement is described in DE 32 11 342 A1. In this arrangement, a cone is inserted into each widened opening of a runner cross channel, and this can be closed off so as to be pressure tight by means of a catch that is inclined at one end and secured in the runner by means of a screw. This means that blind corners in which residual material can collect are unavoidable, and this will eventually disrupt operation or degrade the quality of the product and will, in any case, render cleaning more difficult.

Improved arrangements are described in EP 0 523 549 A2, EP 0 630 733 B1, and EP 0 845 345 A1; these incorporate conical steel inserts that have deflector bores and are secured to the runner by truss-head screws, by being pressed into place by adjuster screws with internal tapers, or are covered by studs.

Even though connections of this kind can operate under extremely high injection pressures, production costs are relatively high and it is not always simple to achieve a precise installation of the tapered inserts. It can be difficult, or even impossible, to achieve exact positional congruence between the bore in the cone and the bore in the runner. In addition, the position of the tapered bore in the runner bore depends on application pressure. This relationship is made even more problematic, the thinner the taper. It is impossible to avoid having blind corners and covered areas in the flow within which injection material can be deposited.

It is an important objective of the present invention to improve this situation and to develop a new type of arrangement which will either avoid the disadvantages described above, as well as other disadvantages found in the prior art, or else eliminate them by simple means. It is intended to satisfy the severe demands imposed by high-speed injection moulding operation and also permit rapid colour changes. In addition, a further aim of the present invention is to describe a configuration of the connection arrangement such that the manufacture of balanced runners is made more simple. The means that are used to do this are intended to provide for cost-effective production and ensure convenient installation and removal.

In accordance with the invention, in an arrangement for closing off channel sections in a hot-channel runner that has at least one channel that can be charged with a plastified mass and which can be closed of so as to be pressure-tight by plugs that are secured to tile runner so as to be removable, the present invention makes provision such that the plug can be secured in the runner so as to subtend an acute angle with the axis of the channel. This plug has a face surface that can be pressed against a closed annular surface, which encloses an opening in the channel or defines this, in such a way as to be pressure tight. It is thus possible to achieve a fully effective seal that can withstand extremely high pressures, e.g., in the range above 2 kbar, without having to accept blind corners. The plugs form releasable stoppers that permit mechanical cleaning. Thanks to their inclined position, they can be installed and removed rapidly, so that the operations required for a change of material or colour can be completed in an extremely short time.

In accordance with another feature of the invention, the face surface of the plug is configured as a closed sealing edge on a pressure piece that is guided along its axis. This feature results in a precisely shaped seal on the annular surface. Imprecise alignment or shifting of the annular and face surfaces are thus avoided from the very outset. The pressure piece can be moved in a particularly simple manner if the plug incorporates a screw body, to or in which a tool can be fitted.

In accordance with yet another feature of the invention, the plug may be formed in two parts, in that a separate pressure piece precedes a screw head. It is an additional feature of the invention that this pressure piece may be guided precisely in an inclined bore that opens out into the area of the channel in the runner that is to be sealed off. Because of the close fit of the face surface of the plug on the annular surface, minor angular deviations or even a small offset of the separated screw body will not affect the seal that is achieved. The inclined bore is best made as a stepped bore, with a threaded section to accommodate the screw head being adjacent to an outside section of somewhat greater diameter, this being followed inside by a cylindrical and even narrower section within which the pressure piece of the plug fits very closely.

In accordance with another aspect of the invention, the face surface of the plug can be flat, at least in part, namely, on the sealing edge, so that an immediate, tight form fit with the annular surface is ensured. The face surface of the plug may be curved, which is to say that, in particular, it projects partially from the plane of the seal within the sealing edge. Such curvature may be in the form of a spherical segment, the maximal radial extent of which—as related to the axis of the plug—is defined by the smallest radius of the sealing edge.

It is still another aspect of the invention that the curvature of the face surface may be concave. Thus, it forms a recess by which it is possible to achieve a precise and improved shape at a corner or elbow of the channel section without the need to prevent rotation of the plug or of the pressure piece. In particular, in this way it is also possible to achieve a continuous transition to a branch channel so that an even or continuous cross section is formed; an associated nozzle with an identical channel width can be installed adjacent to this.

Yet another feature of the invention offers still other advantages in providing a convex, in particular slightly spherical, curvature on the face surfaces and/or on the upper side of the pressure piece that is proximate to the screw head. In addition, if there is an angular deviation from the axis of the plug, in addition to the central pressure, there will be radial force components that act outward, and these can further improve the seal.

It is another aspect of the invention that the pressure piece may have a threaded hole that is arranged, in particular, centrally, into which, once the screw head has been removed, an extraction screw can fit in order to facilitate convenient removal of the pressure piece from the inclined bore in the runner, e.g., for cleaning purposes.

It is an advantage if, in accordance with an additional feature of the invention, the annular surface is arranged at a corner or elbow, where the channel makes a transition to a branch or outlet opening of the runner, particularly for injecting plastic into a nozzle that is arranged on the runner. According to still another feature, on the outside the annular surface is delimited in a circle, whereas the inside shape can be oval, for instance at an elbow or bend in the channel. A tool that is inserted obliquely into the runner, such as a milling head, can generate the annular surface in this corner area. Its size and inside shape will be determined by the angle subtended with the axis of the channel as well, as by the penetration depth achieved by the tool. In another configuration, the annular surface is formed, for example, as a ground and polished surface such that it defines a plane that is perpendicular to the angle. Because of this, the face surface of the plug that is to be sealed is exactly parallel to said surface, whereby a close fit against the annular surface will be ensured in every case.

It is still another aspect of the invention that selected sections can be closed off by pairs of plugs that are associated with each other on a runner channel with a series of branches. Thus, in a particularly rational manner, it is possible to provide a through channel in the runner from which branch nozzles that are arranged symmetrically, e.g., in pairs, can be supplied with injection plastic in a precisely balanced arrangement. From the design standpoint, it is of advantage if, according to yet another aspect, there are annular surfaces that are inclined in the opposite sense to each other at the end of the channel, in which the correspondingly inclined plugs can be installed.

Generally speaking, for both the installation and for the effect of the plug it is useful, according to one feature of the invention, to arrange the plug at an angle to the axis of the channel that is in the range from 30° to 45°, preferably 40° to 45°. Such an inclined position provides not only good accessibility but also ensures a large periphery of the opening's annular surface on the particular canal section or area. One thereby avoids excessive mechanical loads and excessive pressure per unit area on the channel or at an elbow or corner. In addition, it permits a really exact form fit on a relatively extended annular surface. There are no areas shielded from the flow of material in the outlet to the nozzle; rather, this area can be completely flushed because, in the normal course of events, material is often deposited directly behind the diversion point, and this is thermally damaged during operation.

According to an additional feature of the invention, a plug can be fixed in position, e.g., by means of a safety pin that can be so screwed into or inserted into the runner, transversely to the axis of the channel, or transversely to the axis of the plug, that the plug is wedged into position.

Additional features, details, and advantages of the present invention are set out in the claims and in the following description, which is based on embodiments shown in the drawings appended hereto. These drawings show the following:

BRIEF DESCRIPTION OF THE SEVERAL VIEWS OF THE DRAWINGS

FIG. 1: An axial cross section through a runner, on the section line I—I in FIG. 4;

FIG. 2: An enlarged partial cross section as in the circle II in FIG. 1;

FIG. 3: An enlarged partial cross section as in the circle III in FIG. 1;

FIG. 4: A plan view of the runner as in FIG. 1;

FIG. 5: An axial cross section through another embodiment of a runner.

The embodiment that is shown in FIGS. 1 to 4 shows a runner that bears the overall number 10; this incorporates a screw-type connector 13 that is arranged centrally in a plate 12; this screw-type connector 13 provides a connection to a connector (not shown herein) through which the injection plastic passes through an entry channel 14 of the runner 10. A runner main channel 15 extends transversely to the central feed channel, and the ends 18, 18' of this can be closed off in a manner known in the art. Branches 34 extend from the main channel 15 on the under side of the runner plate 12, where nozzles (not shown herein) of the identical internal diameter can be connected. A screw-type connection 17 for a distance piece (not shown herein) is provided centrally on the under side of the runner plate 12 and, in the same way as the nozzles, this provides for precise mounting on a mould plate of an injection-moulding machine.

FIG. 2 and FIG. 3 show, in particular, that inclined bores 16 in the corner areas 38 subtend an acute angle α to the axis A of the channel 15; these are to be closed off in order to divert the injection plastic that is introduced through the entry channel 14 into the branches 34. In the elbow in question there is an opening 42 that is enclosed by an annular surface 40. The inside surface of the elbow can be machined through the opening 42, so as to produce an inclined surface 39, for example (FIG. 2).

Each inclined bore 16 accommodates a sealing plug 20. It is preferred that this comprise two parts and have a screw body 22 with a head 24), which can be shaped internally and/or externally in order to accommodate a tool (not shown herein). In that part that is directed inwards, the screw body 22 has an entry chamfer 23. A pressure piece 26 is arranged in front of the screw body 22 and this is chamfered to the outside and has a central threaded bore that will accommodate a screw (not shown herein) that can be threaded into it. This provides for ease of installation and removal of the pressure piece 26. Its face surface 30 together with its outer part that forms a sealing ring 31 forms a pressure-tight closure of the opening 42 on the annular surface 40. It is expedient that the inclined bore 16 be stepped, so that a threaded section for accommodating the screw body 24 adjoins an outer inlet section of somewhat greater width, this being followed inside by an even narrower cylindrical section that guides the pressure piece 26 so as to form an extremely tight fit. Its upper side 27 (FIG. 3) can be configured so as to be slightly spherical in order to compensate for any angular deviation of the plug 20 that may be caused by the thread and to ensure a tight shaped fit of the sealing surface 31, 40.

In the example shown in FIG. 2, the face surface 30 of the pressure piece 26 is flat and the corner area 38 is closed off by a flat surface. This arrangement is particularly simple and can be produced very accurately from the point of view of production technology.

An alternative is shown in FIG. 3, where the pressure piece 26 has a flat sealing ring 31 on its face surface 13, and this rests on the annular surface 40 around the opening 42. However, there is a depressed area 32 located centrally on the face surface 30; this is in the shape of a section of a sphere, for example, so that a smooth transition from the main channel 15 to the branch 34 is generated as a result of this additional shaping.

The angle α subtended between the axis A of the channel 15 and the axis S of the plug 20 is generally in the range from 30° to 45°, and especially at 40° to 45°. Because of this, no areas that are shielded from the flow are formed in the branches 34 (towards the nozzle), so that the corner areas 38, 39 are always completely flushed. It can be seen that the plug arrangement forms removable closures that permit mechanical cleaning that can be completed within very short periods of down time.

The further construction of a runner 10 is shown in FIG. 4 in conjunction with FIG. 1. It can be seen that on the upper and lower side of the plate 12 there are receptacles for tempering means, namely for a heating coil 48 that is cast in place and supplied with heating current by way of electrical connections 46. On both sides of the central connections 17, 13, respectively, at the longitudinal centre of the plate 12, there are branches 34 that run from the channel 15; a nozzle 50 is indicated diagrammatically on each of these.

In another embodiment (FIG. 5), in its plate 12 the runner 10 has two channel bores 15 that are made from the ends 18,18", and four branches 34 run from each of these to the underside of the plate. In addition, there are transverse bores 37 at selected sections 36 that are to be closed off; these run parallel to the plane of the plate and can, in their turn, make the transition to become additional branches (not shown herein). The selected sections 36 can be closed off at the interior areas of the channel 15 by plugs 20, in order that nozzles that branch off can be supplied with injection material symmetrically by precisely balanced section management. The inclined bores 16 and the plugs 20 are inclined in opposite directions relative to each other.

In FIG. 1 to FIG. 3, and in FIG. 5, it can also be seen that there can be threaded bores 44 in the upper side of the plate in order to secure distance pieces (not shown herein) that permit the application of pressure on the nozzle that is needed for sealing within the injection-welding machine.

The present invention is not restricted to the embodiments described heretofore, but can be modified in numerous ways. For example, in accordance with the invention, a plug 20 can be fixed in its proper position by means of a safety pin that can be driven or screwed into the runner transversely to the axis A of the channel 15 or transversely to the axis S of the plug 20. In such a case, a threaded section of the inclined bore 16 and a screw body 22 of the plug can be eliminated so that this can be made in one piece with the pressure piece 26.

It can, however, be seen that according to the present invention, plugs 20 that can be removed and which are, in particular, made in two pieces are used to provide pressure-tight closure of channel sections in a hot channel runner 10; these are arranged to subtend an acute angle a with the axis A of a channel 15 that can be charged with plastified injection material and can be pressed with a closed sealing edge of the face surface 30 on a closed annular surface 40 that encloses an opening 42 of the channel 15. The angle α is, for example, from 40° to 45°. The plug 20 has a pressure piece 26 ahead of a threaded body 22 that can be screwed into an inclined bore 16 that opens out at the area of the channel in the runner 10 that is to be closed off. At the sealing edge 31, the face surface 30 of the plug is flat. Radially within, there can be a concave or spherical curvature 32, e.g., in the form of a section of a sphere radially on the inside and the diameter of this is limited by the smallest radius of the sealing edge 31. The annular surface 40 that is defined outwards circularly can be arranged at an elbow 38 with which the channel 15 makes the transition to become a branch 34 of the runner 10. On a continuous channel 15 with a series of branches 34, selected sections 36 whose ends have annular surfaces that are inclined in opposite directions relative to each other can be closed off by associated plugs 20.

All of the features and advantages, including design details and spatial arrangements, that are set out in the claims, the description, and in the drawings can be considered essential to the present invention both in and of themselves and in various combinations.

REFERENCE NUMBERS USED IN DRAWINGS

| | |
|---|---|
| 10 | runner |
| 12 | plate |
| 13 | screw-type connector |
| 14 | entry channel |
| 15 | main channel |
| 16 | inclined bore |
| 17 | screw-type connection |
| 18, 18' | ends |
| 19 | receptacles |
| 20 | plugs |
| 22 | screw body |
| 23 | entry chamfer |
| 24 | head |
| 26 | pressure piece |
| 27 | upper side |
| 28 | threaded hole |
| 30 | face surface |
| 31 | sealing ring |
| 32 | depressed area |
| 34 | branch(es) |
| 36 | section(s) |
| 37 | transverse bore |
| 38 | corner/elbow |
| 39 | inclined face |
| 40 | annular surface |
| 42 | opening |
| 44 | threaded bore(s) |
| 46 | electrical connection |
| 48 | heating coil |
| 50 | nozzles |

What is claimed is:

1. Arrangement for closing off channel sections in a hot-channel runner (10) that has at least one channel (15) that can be charged with plastified injection material, that can be closed off by at least one plug (20) secured to the runner (10) so as to be removable, wherein each plug (20) is secured in the runner (10) at an acute angle (α) between the axis of the plug and the axis (A) of the at least one channel (15) and wherein the plug has a face surface (30) that can be pressed against an annular surface (40) that is opposite it and encloses or delimits an opening (42) of the channel (15) so as to be pressure tight.

2. Arrangement as defined in claim 1, characterized in that the face surface (30) of the plug (20) is formed on a pressure piece (26) that is guided along its axis (S) as a closed sealing edge.

3. Arrangement as defined in claim 1, characterized in that the plug (20) has a screw body (22) in or on the head of which a tool can be fitted.

4. Arrangement as defined in claim 1, characterized in that the plug (20) is made in two parts, a separate pressure piece (26) being arranged in front of a screw body (24).

5. Arrangement as defined in claim 4, characterized in that the pressure piece (26) is precisely guided in an inclined bore (16) that opens out at the area of the channel in the runner (10) that is to be closed off.

6. Arrangement as defined in claim 2, characterized in that the face surface (30) of the plug is flat, at least in part, namely on the sealing edge.

7. Arrangement as defined in claim 2 characterized in that the face surface (30) of the plug incorporates a curvature (32), namely within the sealing edge.

8. Arrangement as defined in claim 7, characterized in that the curvature (32) has the form of a section of a sphere, whose maximum radial extent is delimited by the smallest radius of the sealing edge.

9. Arrangement as defined in claim 7, characterized in that the curvature (32) in the face surface (30) is concave.

10. Arrangement as defined in claim 4, characterized in that there is a convex, in particular a slightly bulbous curvature (32) on the face surface (30) and/or on the upper side (27) of the pressure piece (26) that is proximate to the screw head (24).

11. Arrangement as defined in claim 3, characterized in that the pressure piece (26) incorporates—especially centrally—a threaded hole (28) that faces the screw body (24).

12. Arrangement as defined in claim 1, characterized in that the annular surface (40) is arranged at a corner or elbow (38) with which the channel (15) makes the transition to become a branch (34) or an outlet opening of the runner (10).

13. Arrangement as defined in claim 1, characterized in that on the outside, the annular surface (40) is delimited circularly.

14. Arrangement as defined in claim 1, characterized in that the annular surface (40) is so ground that it defines a plane that is parallel to the angle ($\alpha$).

15. Arrangement as defined in claim 1, characterized in that on a runner-through channel (15) with a series of branches (34), selected sections (36) can be closed off by associated plugs (20).

16. Arrangement as defined in claim 15, characterized in that at the ends of the sections (36) there are appropriately inclined annular surfaces (40; 40') on each of which there can be plugs (20) that are inclined in opposite directions relative to each other.

17. Arrangement as defined in claim 1, characterized in that the angle (a) is in the range from 30° to 45°, and preferably from 40° to 45°.

18. Arrangement as defined in claim 1, characterized in that the or each plug can be fixed in position.

19. The arrangement recited in claim 1, wherein the axis of the plug is a longitudinal axis (S) thereof.

20. The arrangement recited in claim 1, wherein the plug has a single face surface (30) for sealing a channel elbow said single face surface (30) inclined at an acute angle to both said axis (A) and to an axis of a branch of the runner (10) diverting from the channel (15), the single face surface (30) sealing both the channel and the diverting branch.

21. Arrangement for closing off channel sections in a hot-channel runner (10) that has at least one channel (15) that can be charged with plastified injection material, that can be closed off by at least one plug (20) removably secured to the runner (10)

wherein the at least one plug (20) is secured in the runner (10) so as to subtend an acute angle ($\alpha$) with the axis (A) of the at least one channel (15) and comprises a front face (30) adapted to be pressed sealingly against an opposite annular surface (40) which encloses an inclined opening (42) at a channel elbow (38).

22. Arrangement for closing off channel sections in a hot-channel runner (10) that has a plurality of legs (15, 34) that can be charged with plastified injection material, the legs connected at a corner (38) that can be closed off by a single plug (20) movably secured to the runner (10), wherein the runner comprises an annular surface (40) surrounding the corner of the joined runner legs, said plug (20) is secured in the runner (10) at inclined acute angles between the axis of the plug and the axes of each of the legs (15,34), and wherein said plug has a single face surface (30) adapted to be pressed sealingly against said annular surface (40) in opposition thereto for sealing said corner.

* * * * *